US008705882B2

(12) United States Patent
Tatsumi

(10) Patent No.: US 8,705,882 B2
(45) Date of Patent: Apr. 22, 2014

(54) IMAGE PROCESSING APPARATUS SELECTIVELY OUTPUTTING FIRST AND SECOND SUBFRAMES AT A PREDETERMINED TIMING AND METHOD OF CONTROLLING THE SAME

(75) Inventor: Eisaku Tatsumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 12/891,278

(22) Filed: Sep. 27, 2010

(65) Prior Publication Data

US 2011/0103708 A1 May 5, 2011

(30) Foreign Application Priority Data

Oct. 30, 2009 (JP) ................................ 2009-251358

(51) Int. Cl.
*G06K 9/40* (2006.01)

(52) U.S. Cl.
USPC .......................................................... 382/260

(58) Field of Classification Search
None
See application file for complete search history.

(56) References Cited

U.S. PATENT DOCUMENTS

| | | | | |
|---|---|---|---|---|
| 6,278,445 | B1 | 8/2001 | Tanaka et al. | 345/178 |
| 6,603,877 | B1 * | 8/2003 | Bishop | 382/165 |
| 7,260,244 | B2 * | 8/2007 | Shikami et al. | 382/112 |
| 7,542,619 | B2 | 6/2009 | Toyooka et al. | 382/260 |
| 2004/0057629 | A1 | 3/2004 | Shikami et al. | |
| 2005/0117779 | A1 * | 6/2005 | Horie et al. | 382/103 |
| 2006/0119617 | A1 * | 6/2006 | Toyooka et al. | 345/619 |
| 2006/0290780 | A1 * | 12/2006 | Porikli | 348/129 |
| 2007/0269099 | A1 * | 11/2007 | Nishino et al. | 382/141 |
| 2008/0069399 | A1 * | 3/2008 | Nagao et al. | 382/103 |
| 2008/0101512 | A1 * | 5/2008 | Mohamed et al. | 375/350 |
| 2009/0040374 | A1 * | 2/2009 | Kobayashi | 348/448 |
| 2009/0109290 | A1 * | 4/2009 | Ye et al. | 348/155 |
| 2009/0226110 | A1 * | 9/2009 | Chen et al. | 382/263 |

(Continued)

FOREIGN PATENT DOCUMENTS

| | | | |
|---|---|---|---|
| JP | 2000-30052 | A | 1/2000 |
| JP | 2004-109047 | A | 4/2004 |
| JP | 2006-184896 | | 7/2006 |
| WO | 2009/083926 | A2 | 7/2009 |

OTHER PUBLICATIONS

Baba, Masashi, Masayuki Mukunoki, and Naoki Asada. "Shadow removal from a real image based on shadow density." ACM SIGGRAPH 2004 Posters. ACM, 2004.*

(Continued)

*Primary Examiner* — Stephen R Koziol
*Assistant Examiner* — Sean Connor
(74) *Attorney, Agent, or Firm* — Fitzpatrick, Cella, Harper & Scinto

(57) ABSTRACT

To reduce flickering in driving distributed processing, an image processing apparatus which generates and outputs a plurality of sub frame images having different luminance patterns for each of a plurality of frame images included in input moving image data, includes a filtering unit configured to perform filter processing for the frame image, a setting unit configured to set a first coefficient A and a second coefficient B, a first generation unit configured to generate a first sub frame image, a second generation unit configured to generate a second sub frame image, and an output control unit configured to selectively output the first sub frame image and the second sub frame image at a predetermined timing.

8 Claims, 12 Drawing Sheets

(56) References Cited

U.S. PATENT DOCUMENTS

| | | | | |
|---|---|---|---|---|
| 2009/0273611 | A1 | 11/2009 | Itokawa et al. | 345/619 |
| 2010/0104162 | A1* | 4/2010 | Falk et al. | 382/131 |
| 2011/0019095 | A1* | 1/2011 | He et al. | 348/607 |
| 2011/0128449 | A1* | 6/2011 | Ishihara | 348/701 |
| 2011/0234899 | A1* | 9/2011 | Kobayashi | 348/447 |

OTHER PUBLICATIONS

Moses, R.A., and Hsrt, W.M. (ed), "Adleris Physiology of the Eye", Clinical Application, St. Louis: The C.V. Mosby Company, 1987, p. 517.

Japanese Office Action dated Jun. 18, 2013, issued in counterpart Japanese Application No. 2009-251358.

* cited by examiner

IMAGE PROCESSING APPARATUS SELECTIVELY OUTPUTTING FIRST AND SECOND SUBFRAMES AT A PREDETERMINED TIMING AND METHOD OF CONTROLLING THE SAME

BACKGROUND OF THE INVENTION

1. Field of the Invention

The present invention relates to an image processing technique and, more particularly, to image processing when a display device displays a moving image.

2. Description of the Related Art

Moving image display devices represented by a TV set can be classified into hold-type display devices and impulse-type display devices. A hold-type display device continues displaying a single image in one frame interval (1/60 sec when the frame rate is 60 Hz). A liquid crystal display device and organic EL display using TFTs are known as hold-type display devices. On the other hand, an impulse-type display device displays an image only in the scanning interval of one frame interval so the pixel luminances start lowering immediately after the scanning. A CRT (Cathode Ray Tube) and FED (Field-Emission-type Display) are known as impulse-type display devices.

A hold-type display device is known to have a problem that a viewer readily perceives blurs of a moving object displayed on the screen (motion blurring). To cope with the blurs, the hold-type display device raises the driving frequency of its display to shorten the hold time. For example, Japanese Patent Laid-Open No. 2006-184896 discloses a technique (to be referred to as driving distributing hereinafter) which generates two sub frames from one input frame, that is, a sub frame without a high frequency component and a sub frame containing an emphasized high frequency component, and alternately displays two sub frames generated in correspondence with each frame.

On the other hand, an impulse-type display device is more advantageous in moving image visibility than a hold-type display device. However, since the device emits light only instantaneously in each frame interval (1/60 sec when the frame rate is 60 Hz), and repeats light emission at the period of 1/60 sec, a problem of flickering may arise. Flickering is more noticeable on a larger screen, and therefore tends to be a serious problem especially in the recent trend shifting toward display devices with wider screens. The impulse-type display device adopts, as a measure against flickering, a technique of raising the driving frequency of its display.

However, the present inventor found by experiments that even when the frame rate is raised by driving distributing, flickering is observed if the frame rate of the moving image before processing is relatively low. More specifically, if the moving image before processing has about 50 frames or less per sec, and a frame image includes a write (bright) image portion and a black (dark) image portion adjacent to each other, relatively strong flickering is observed at the peripheral portion of the white image portion.

SUMMARY OF THE INVENTION

The present invention provides a higher-quality display image for a viewer when a display device displays a moving image.

According to one aspect of the present invention, an image processing apparatus which generates and outputs a plurality of sub frame images having different luminance patterns for each of a plurality of frame images included in input moving image data, comprises: a filtering unit configured to perform filter processing for the frame image; a setting unit configured to set a first coefficient A and a second coefficient B so as to satisfy $0<A/(A+B)<1$; a first generation unit configured to generate a first sub frame image by subtracting an image obtained by multiplying a frame image processed by the filtering unit by the second coefficient B from an image obtained by multiplying a frame image unprocessed by the filtering unit by the first coefficient A; a second generation unit configured to generate a second sub frame image by adding the image obtained by multiplying the frame image unprocessed by the filtering unit by the first coefficient A to the image obtained by multiplying the frame image processed by the filtering unit by the second coefficient B; and an output control unit configured to selectively output the first sub frame image and the second sub frame image at a predetermined timing.

According to another aspect of the present invention, a method of controlling an image processing apparatus which generates and outputs a plurality of sub frame images having different luminance patterns for each of a plurality of frame images included in input moving image data, the image processing apparatus including a filtering unit configured to perform filter processing for the frame image, the method comprises the steps of: setting a first coefficient A and a second coefficient B so as to satisfy $0<A/(A+B)<1$; generating a first sub frame image by subtracting an image obtained by multiplying a frame image processed by the filtering unit by the second coefficient B from an image obtained by multiplying a frame image unprocessed by the filtering unit by the first coefficient A; generating a second sub frame image by adding the image obtained by multiplying the frame image unprocessed by the filtering unit by the first coefficient A to the image obtained by multiplying the frame image processed by the filtering unit by the second coefficient B; and selectively outputting the first sub frame image and the second sub frame image at a predetermined timing.

According to the present invention, it is possible to provide a higher-quality display image for a viewer when a display device displays a moving image.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described in detail in accordance with the accompanying drawings. Note that the following embodiments are not intended to limit the scope of the invention, but are merely examples.

First Embodiment

As the first embodiment of an image processing apparatus according to the present invention, an image processing apparatus 100 which outputs an image to a panel module serving as a display device will be exemplified below. Note that in the following description, "frame frequency" indicates the number of frames displayed per sec in progressive scanning, or the number of fields displayed per sec in interlaced scanning.

<Technical Premise>

The display characteristics of the hold-type display device and impulse-type display device described above in "BACKGROUND" will be described in more detail. An example of moving image data of 60 frames per sec (60 Hz) will be explained here.

Hold-Type Display Device

Figure 9:
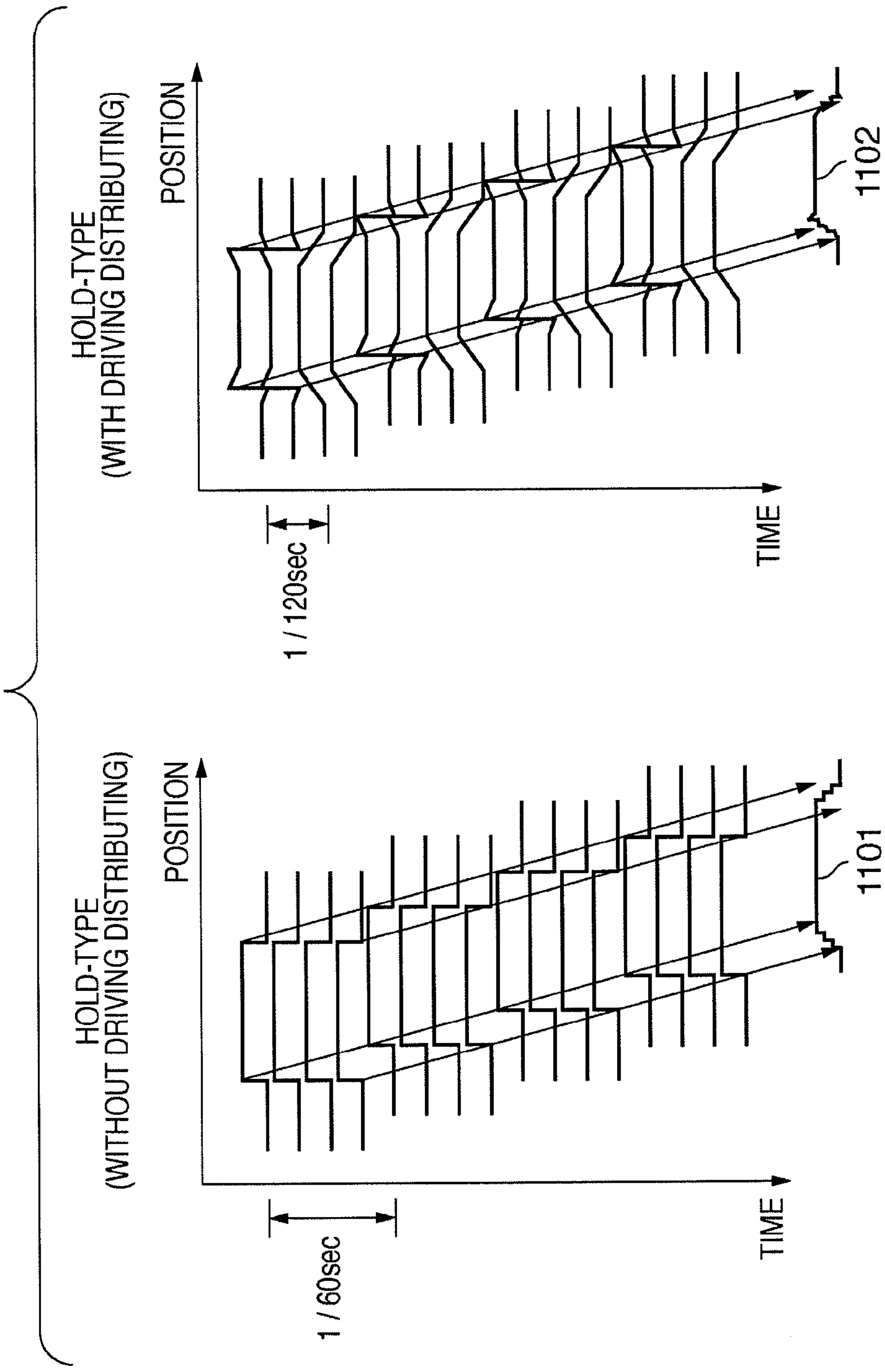
FIG. 9 PRIOR ART
FIG. 9 shows views for explaining the dynamic characteristic of display of a hold-type display device and the dynamic characteristic upon driving distributing.

FIG. 9 shows views for explaining the dynamic characteristic of display of a hold-type display device and the dynamic characteristic upon driving distributing. In FIG. 9, the abscissa represents the position (coordinates) on the display screen, and the ordinate represents time. FIG. 9 shows a state in which an image (for example, a rectangle or a circle) having a uniform brightness is moving from the left to the right of the screen. Note that the rectangular waves shown in FIG. 9 indicate image luminance distributions at the respective timings.

As shown on the left view of FIG. 9, without driving distributing, the image moving from the left to the right of the screen causes blurs (motion blurring) on the hold-type display device. Note that FIG. 9 shows four rectangular waves in each interval of 1/60 sec for the descriptive convenience. In actuality, the image is continuously displayed in the interval of 1/60 sec. When the user's eye tracks the motion of the image, the image stays on the same pixels in the interval of 1/60 sec relative to the motion tracked by the eye so as to generate a relative delay to the motion. If the hold time is long, the delay width increases, and the user perceives it as motion blurring on the screen. A waveform 1101 in FIG. 9 conceptually indicates the way the user tracks the motion without driving distributing. The edges of the waveform 1101 have a moderate staircase shape. As a result, the viewer senses blurs in which the luminance change has a certain width. A waveform 1102 in FIG. 9 conceptually indicates the way the user tracks the motion upon driving distributing. As compared to the waveform 1101, the waveform 1102 have clearer vertical edges. That is, the motion blurring perceived by the viewer is reduced, as can be seen.

Impulse-Type Display Device

Figure 10:
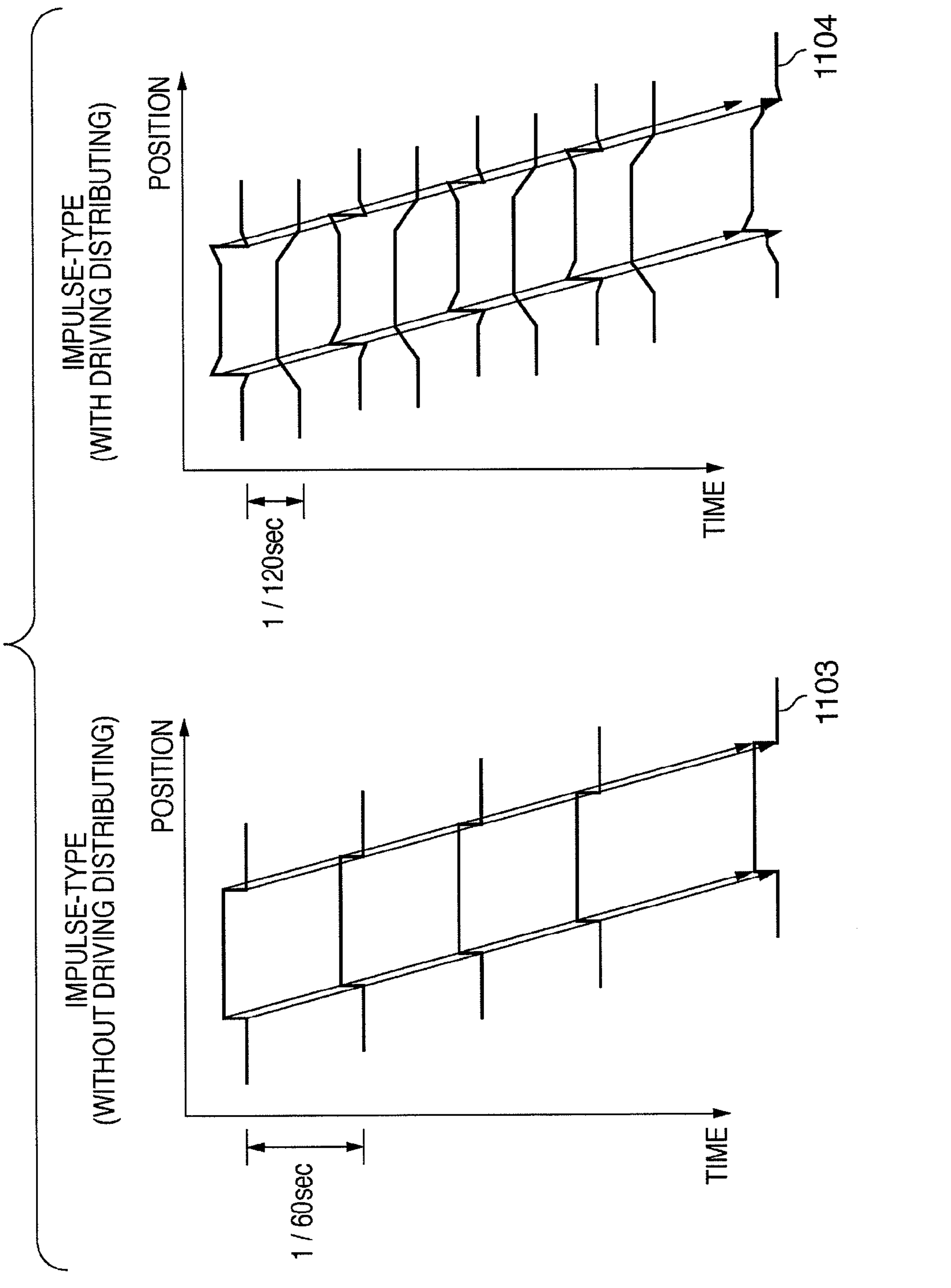
FIG. 10 PRIOR ART
FIG. 10 shows views for explaining the dynamic characteristic of display of an impulse-type display device and the dynamic characteristic upon driving distributing.

FIG. 10 shows views for explaining the dynamic characteristic of display of an impulse-type display device and the dynamic characteristic upon driving distributing. The abscissa and ordinate in FIG. 10 are the same as in FIG. 9. FIG. 10 shows a state in which an image (for example, a rectangle or a circle) having a uniform brightness is moving from the left to the right of the screen. Note that the rectangular waves shown in FIG. 10 indicate image luminance distributions at the respective timings.

As shown on the left view of FIG. 10, the prime characteristic feature is that no motion blurring that generates an afterimage occurs even without driving distributing. A waveform 1103 in FIG. 10 conceptually indicates the way the user tracks the motion without driving distributing. The edges of the waveform 1103 vertically stand, indicating that the viewer senses no blur. A waveform 1104 in FIG. 10 conceptually indicates the way the user tracks the motion when driving distributing is performed as a measure against flickering. As compared to the waveform 1103, the edges of the waveform 1104 are slightly disturbed. However, the viewer perceives very little motion blurring, as can be seen. Note that if the same frame is simply displayed twice instead of performing driving distributing, a double image is generated. However, when the driving distributing method is used, the high frequency component is displayed only once. Although very little blurring is caused by the low frequency component, no double image is generated, and visual degradation is suppressed.

<Arrangement of Apparatus>

Figure 1:
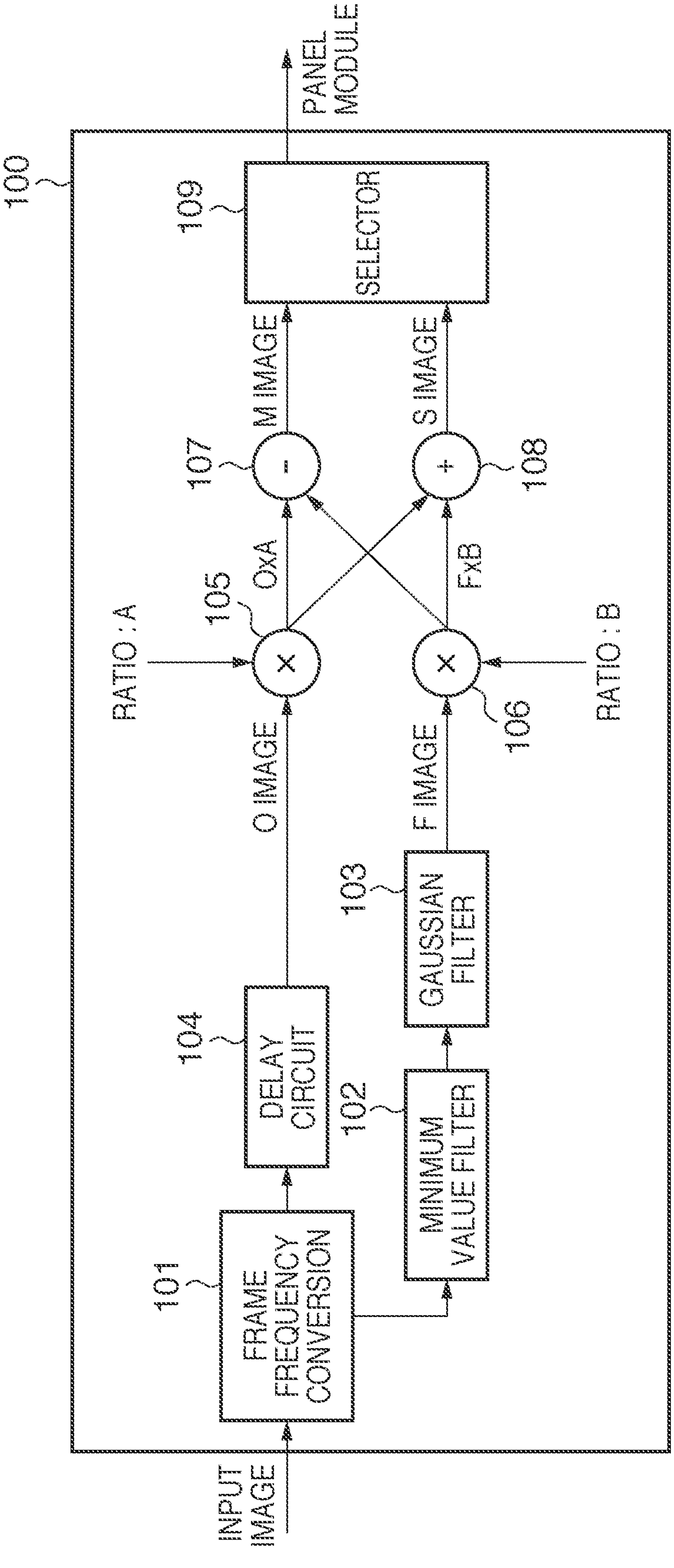
FIG. 1 is a block diagram of an image processing apparatus according to the first embodiment.

FIG. 1 is a block diagram of the image processing apparatus 100 according to the first embodiment. Note that an example will be explained below in which a moving image of 50 frames per sec (50 Hz) is converted into a moving image of 100 frames per sec (100 Hz).

A frame frequency conversion circuit 101 converts the frame frequency of an input original image to a higher frequency. A minimum value filter 102 is configured to substitute the value of a pixel of interest of the input image with the minimum pixel value out of the peripheral pixels around the pixel of interest, and output the image. A Gaussian filter 103 performs filter processing using, for example, a Gaussian function for the input image. A delay circuit 104 outputs the image output from the frame frequency conversion circuit 101 to a multiplication circuit 105 to be described later at a timing adjusted in consideration of the delay of processing from the minimum value filter 102 to the Gaussian filter 103.

The multiplication circuit 105 performs multiplication of the image (O image) output from the delay circuit 104. A multiplication circuit 106 performs multiplication of the image (F image) output from the Gaussian filter 103. A subtraction circuit 107 subtracts the image output from the multiplication circuit 106 from the image output from the multiplication circuit 105, and outputs a "first sub frame" (M image). An addition circuit 108 adds the image output from the multiplication circuit 106 to the image output from the multiplication circuit 105, and outputs a "second sub frame" (S image). A selector circuit 109 (output control unit) selectively sequentially outputs the first sub frame and second sub frame at a predetermined timing. Note that the output image from the selector circuit 109 is output to, for example, the panel module. Note that the F image is formed from the low frequency component of the original frame image because it is obtained by processing the original frame image by the Gaussian filter 103, as is apparent.

<Operation of Apparatus>

Flickering Threshold Frequency

Figure 2:
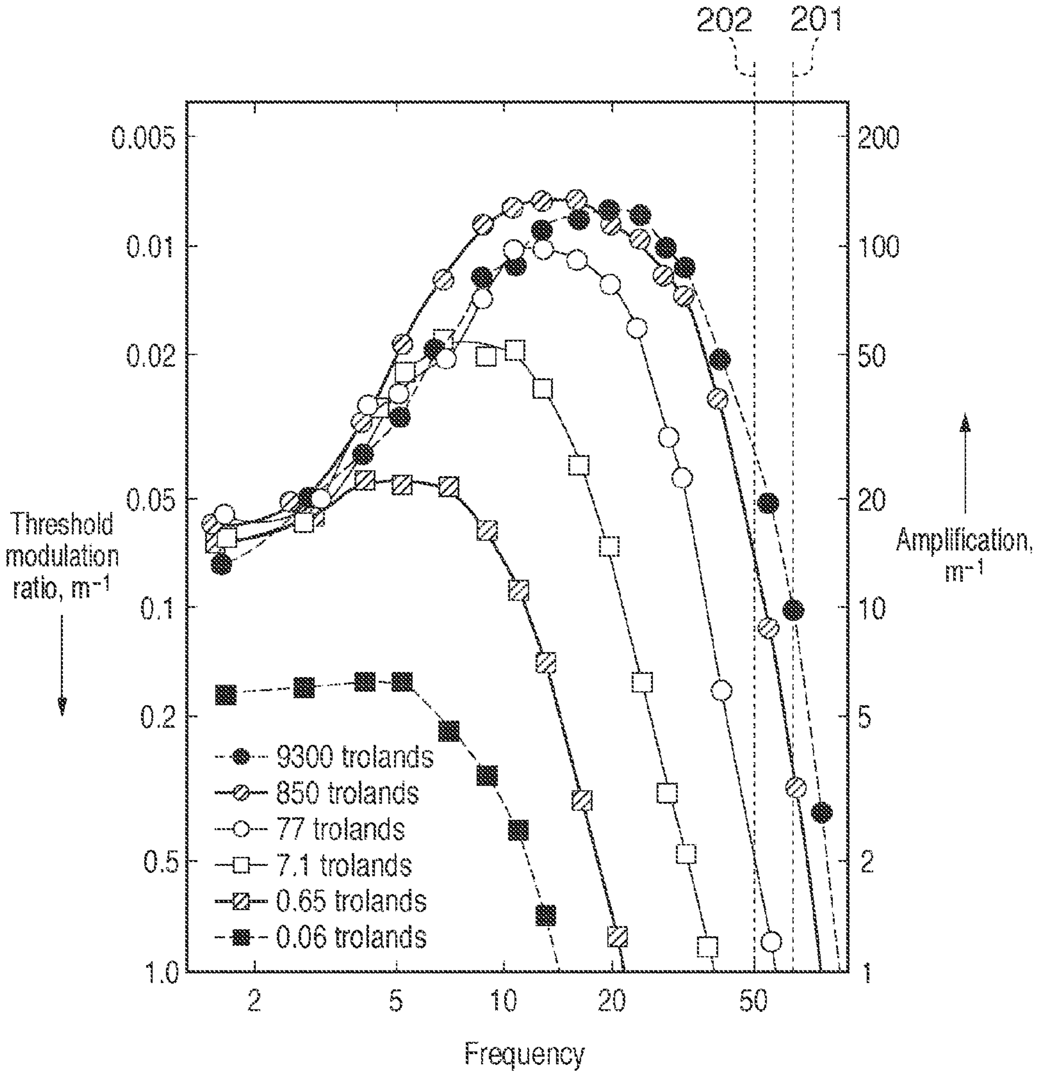
FIG. 2 is a graph showing luminance and flickering threshold frequency for a contrast ratio.

FIG. 2 is a graph showing luminance and flickering threshold frequency for a contrast ratio. FIG. 2 shows ease of flickering perception. Note that FIG. 2 adds an additional line 201 representing 60 Hz and an additional line 202 representing 50 Hz to the graph of experimental results described in reference 1 below. Note that the ordinate represents the contrast ratio, the abscissa represents the frame frequency, and each plot represents the difference in luminance (retinal illuminance). "Troland" is the unit of retinal illuminance.

[Reference 1] Moses, R. A. and Hart, W. M. (ed), Adleris Physiology of the eye, Clinical Application. St. Louis: The C.V. Mosby Company, 1987.

FIG. 2 will be interpreted along the additional line 202. At a frame frequency of 50 Hz, the viewer starts perceiving flickering when the contrast ratio exceeds about 0.1 for a luminance of 850 trolands, or when the contrast ratio exceeds about 0.5 for a luminance of 77 trolands. The graph will be interpreted next along the additional line 201. At a frame frequency of 60 Hz, the viewer starts perceiving flickering when the contrast ratio exceeds about 0.3 for a luminance of 850 trolands. However, when the luminance is 77 trolands, the viewer perceives no flickering independently of the contrast ratio. That is, at 50 Hz, the viewer easily perceives flickering for the same luminance. As is apparent from this, it is preferable to make the frame frequency lower than 60 Hz, when creating the display.

Driving Distributing

Figure 3:
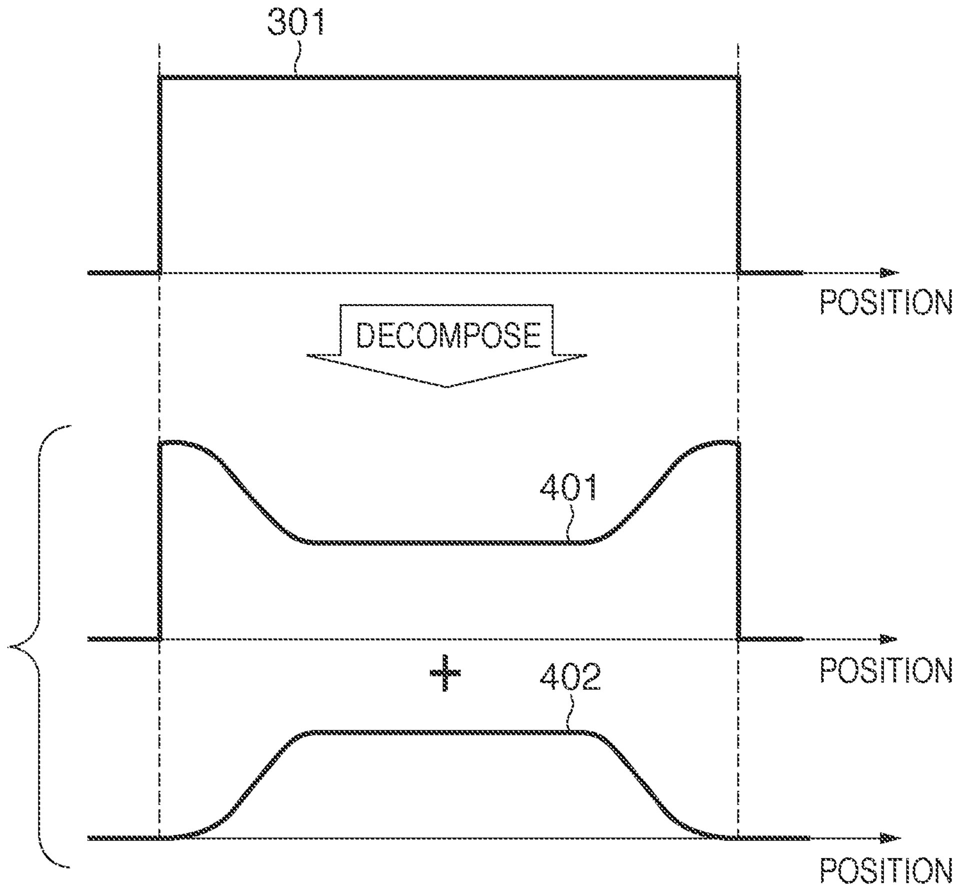
FIG. 3 is a view showing the relationship between an original frame image and two sub frames in simple driving distributing.

FIG. 3 is a view showing the relationship between an original frame image and two sub frames in simple driving distributing. FIG. 3 particularly illustrates a case in which the coefficient of the multiplication circuit 105 is set to 1.0, and the coefficient of the multiplication circuit 106 is set to 0.5. The abscissa represents the position on the screen, and the ordinate represents the luminance. A waveform 301 indicates the luminance change (luminance pattern) of the original frame image. A waveform 401 indicates the luminance change of the first sub frame. A waveform 402 indicates the luminance change of the second sub frame.

Figure 4:
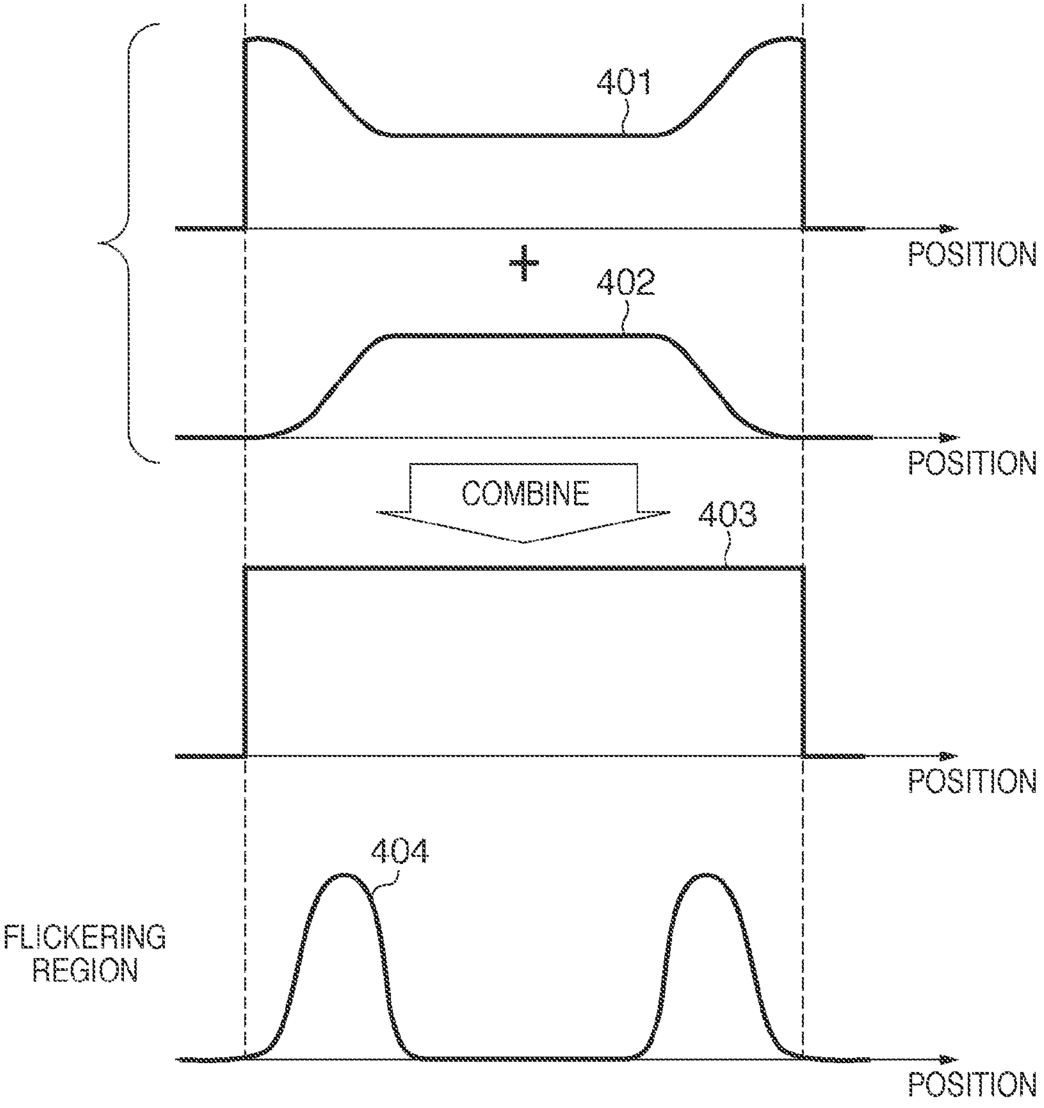
FIG. 4 is a view showing the way a user views flickering when the two sub frames shown in FIG. 3 are combined.

FIG. 4 shows the luminance measured by a measuring instrument when the two sub frames driving-distributed as shown in FIG. 3 are displayed on the panel module. The abscissa represents the position on the screen, and the ordinate represents the luminance. Note that a waveform 403 indicates the simple sum of the waveform 401 of the first sub frame and the waveform 402 of the second sub frame. A waveform 404 indicates a luminance change (flickering intensity) sensed by a human.

That is, when the first sub frame (waveform 401) and the second sub frame (waveform 402) are alternately displayed, the waveform 403 is perceived as brightness. However, flickering occurs at the peripheral portion of the object image, as indicated by the waveform 404.

Figure 5:
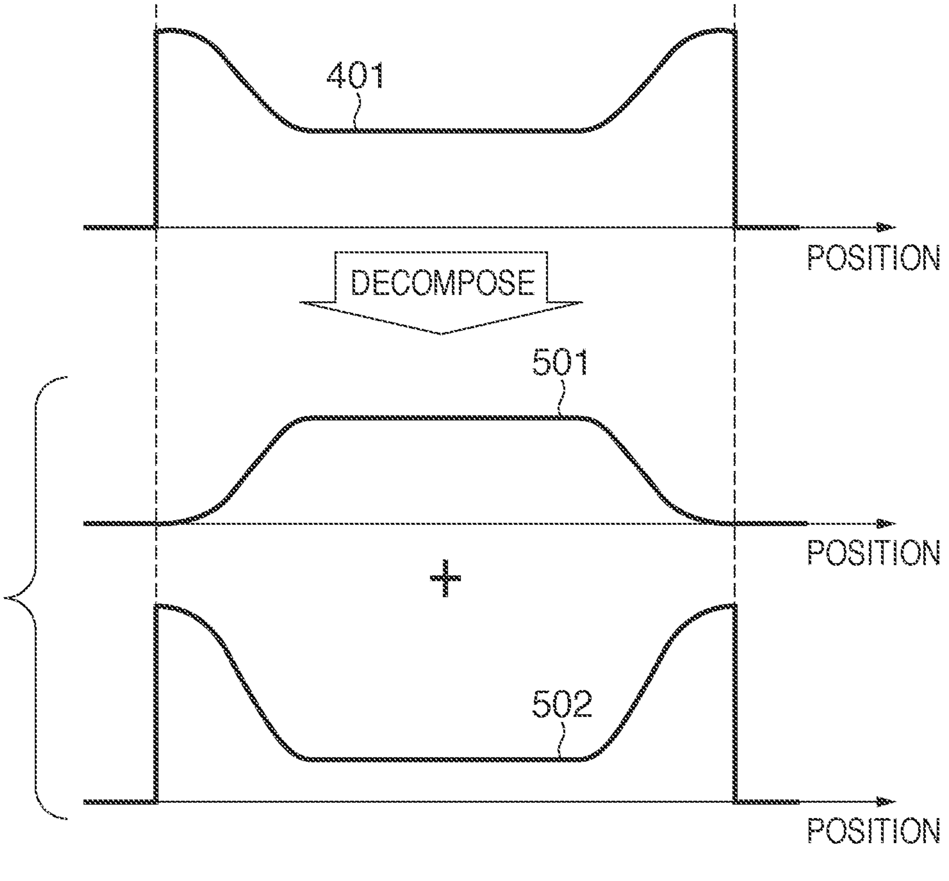
FIG. 5 is a view showing a state in which a sub frame is further decomposed into two sub frames for the descriptive convenience.

This will be explained in more detail with reference to FIG. 5. FIG. 5 is a view showing a state in which a sub frame is further decomposed into two sub frames. The division is done such that a waveform 501 has the same shape as the waveform 402 of the second sub frame, and the remaining part (difference) is represented by a waveform 502. The first sub frame is thus divided into a component which is displayed only once in the two sub frame intervals included in one frame interval (1/50 sec) and a component which is displayed twice. That is, the waveform 501 is the same as the waveform 402 representing the luminance change of the second sub frame, and can therefore be regarded as the component that is displayed twice in one frame interval (1/50 sec). On the other hand, the luminance component of the waveform 502 can be regarded as the component that is displayed only once in one frame interval (1/50 sec).

As described with reference to FIG. 2, no flickering is sensed in 100-Hz display (corresponding to two-time display). However, flickering is readily sensed in 50-Hz display (corresponding to one-time display). In addition, at a portion (peripheral portion) of the waveform 501 with a small value, the frame is displayed only once by the waveform 502, and the contrast ratio is close to 1. At a portion (central portion) of the waveform 501 with a large value, the contrast ratio is 0.1 or less. For these reasons, flickering occurs at the peripheral portion of the object image, as indicated by the waveform 404.

Consider decreasing the luminance difference between sub frames using the multiplication circuits 105 and 106, subtraction circuit 107, and addition circuit 108 shown in FIG. 1. An example will be described here in which a "first sub frame" (M image) is generated by setting the multiplication coefficient of the multiplication circuit 105 to 1.0 and that of the multiplication circuit 106 to 0.4 (first generation unit), and a "second sub frame" (S image) is generated by setting the multiplication coefficient of the multiplication circuit 105 to 0.3 and that of the multiplication circuit 106 to 0.4 (second generation unit).

Figure 6:
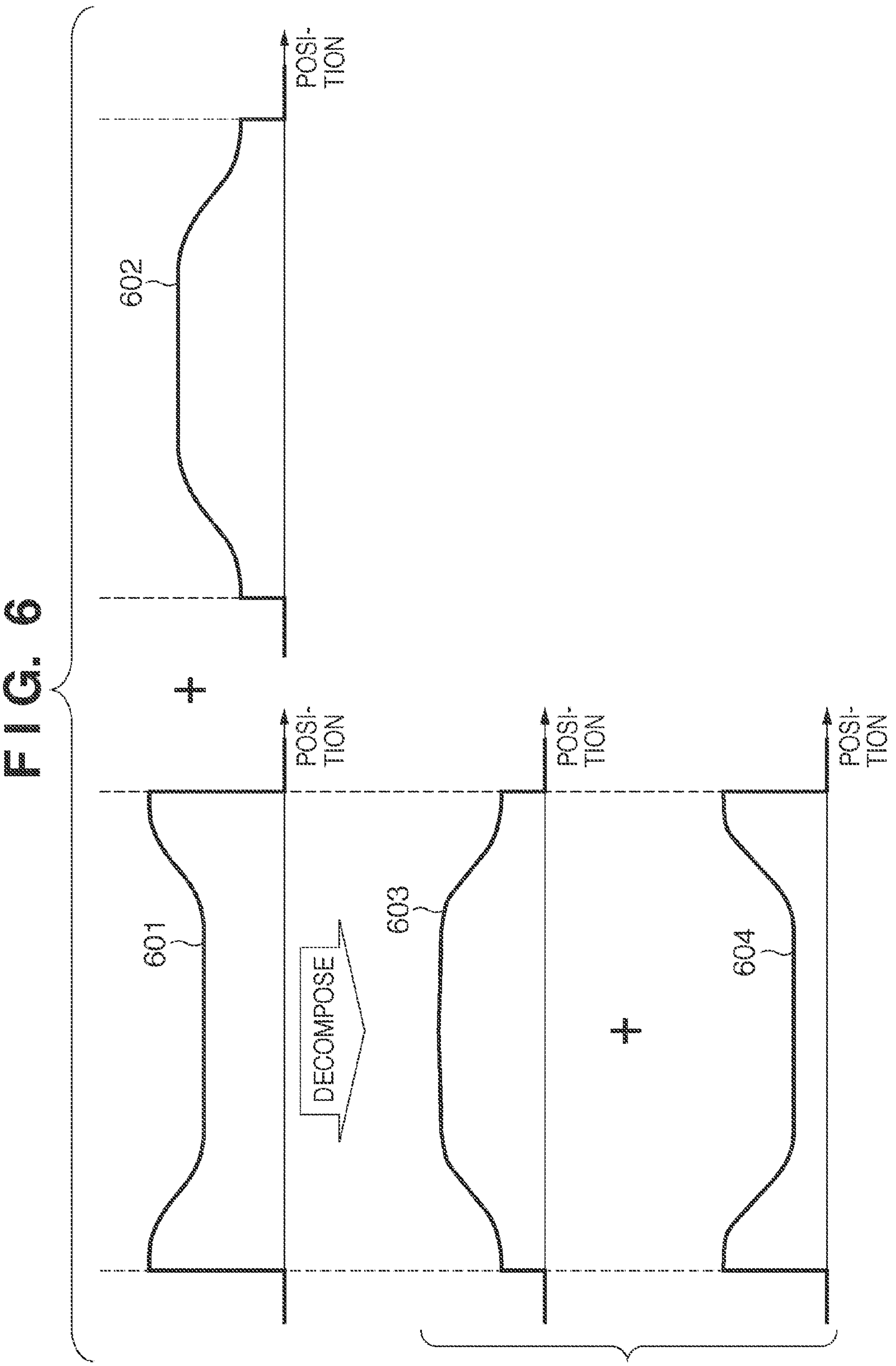
FIG. 6 is a view showing two sub frames generated by the image processing apparatus according to the first embodiment.

FIG. 6 is a view showing sub frames generated upon driving distributing by the image processing apparatus according to the first embodiment. A waveform 601 indicates the luminance change of the first sub frame. A waveform 602 indicates the luminance change of the second sub frame. Waveforms 603 and 604 are obtained by further decomposing the first sub frame 601 into two luminance components for the descriptive convenience. Note that the waveform 603 is generated to be the same as the waveform 602.

The waveform 603 that is the same as the waveform 602 can be regarded as a component that is displayed twice in one frame interval (1/50 sec). On the other hand, the luminance component of the waveform 604 can be regarded as a component that is displayed once in one frame interval (1/50 sec). However, as for the luminance ratio of the waveforms 603 and 604, the luminance ratio is not only low at the central portion of the luminance waveform but also not so high even at the peripheral portion, unlike the case in FIG. 5. More specifically, the contrast ratio at 50 Hz as in FIG. 5 is about 0.1 at the central portion, that is, almost the same as in FIG. 5. However, the contrast ratio at the peripheral portion is about 0.4, that is, much lower than that in FIG. 5.

As is apparent from FIG. 2, although flickering is still sensed, the contrast ratio of 0.4 at the peripheral portion is much lower, and the flickering intensity sensed by a human decreases by more than half. That is, the contrast ratio of two sub frames can be adjusted using two sub frames generated by the image processing apparatus shown in FIG. 1. This allows to adjust the flickering intensity to be sensed by a human.

Note that the multiplication coefficients of the multiplication circuits 105 and 106 need to be set in association with the frequency of the input image. Letting A be the multiplication coefficient (first coefficient A) of the multiplication circuit 105, and B be the multiplication coefficient (second coefficient B) of the multiplication circuit 106, $$0<A/(A+B)<1$$

holds. However, when $A/(A+B)\approx 1$, double blurring of a moving image is intense. When $A/(A+B)\approx 0$, flickering is intense at the peripheral portion of a white (bright) image. The present inventor inspected actual images and found that $$0.2<A/(A+B)<0.8$$

is effective. More preferably, a higher-quality image in which both double blurring and flickering are suppressed is obtained within the range of $$0.4<A/(A+B)<0.6$$

Example of Application to Movie (24p) Content Display

An example has been described above in which two sub frames (sub frame images) are generated from each of a plurality of frame images included in moving image data of 50 frames per sec (50 Hz), and a moving image of 100 frames per sec (100 Hz) is output. However, the present invention is also applicable to any other input frame rate and any other output frame rate.

An example will be described below in which a video having a frame frequency of 24 Hz used in many movie contents is displayed. Referring to FIG. 2, when a content of 24 Hz is displayed at 24 Hz, the viewer senses strong flickering. In a movie theater, a movie content is displayed at a double frequency, that is, 48 Hz by using each frame twice. Several models of commercially available flat panel displays (FPD) display a content by increasing the frequency to an integer multiple such as three times (72 Hz) or five times (120 Hz).

In general, a director makes a picture with unique blurring in 48-Hz display at a movie theater in mind, and checks the video actually displayed on a screen at 48 Hz. However, since the luminance of a commercially available FPD is higher than in a movie theater, the viewer senses flickering in 48-Hz display as in a movie theater. To prevent this, the commercially available FPD displays a content at a frequency three times (72 Hz) or five times (120 Hz). However, simple 72- or 120-Hz display yields blurring different from that in 48-Hz display at a movie theater. The display cannot reproduce the same blurring as in a movie theater, and thus cannot exactly reflect the director's intention.

Figure 7:
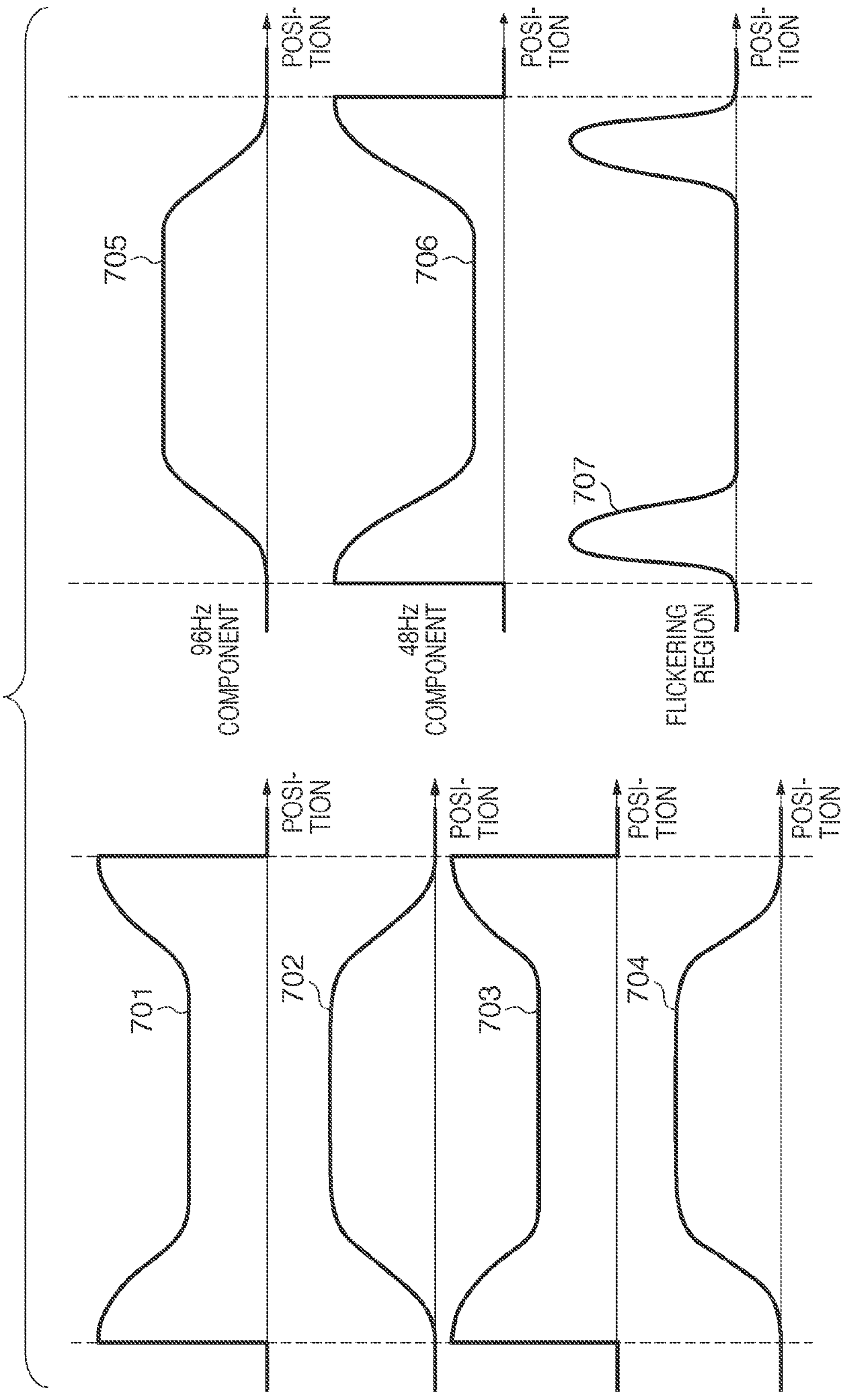
FIG. 7 is a view showing movie content display by simple driving distributing and the way a user views flickering.

FIG. 7 is a view showing sub frames of a movie content displayed by simple driving distributing. This corresponds to a case in which, for example, the image processing apparatus 100 of the first embodiment fixes the multiplication coefficient of the multiplication circuit 106 at 0.4, and sets the multiplication coefficient of the multiplication circuit 105 to 1 for a first sub frame and 0 for a second sub frame. Waveforms 701 and 703 indicate the luminance change of the first sub frame. Waveforms 702 and 704 indicate the luminance change of the second sub frame. Waveforms 705 and 706 are obtained by further decomposing the first sub frame 701 into two luminance components for the descriptive convenience. Note that the waveform 705 is generated to be the same as the waveform 702.

In this state, the waveform 705 that is the same as the waveform 702 can be regarded as a component that is displayed four times in one frame interval (1/24 sec). On the other hand, the luminance component of the waveform 706 can be regarded as a component that is displayed only twice in one frame interval (1/24 sec). With the waveform 706 of the 48-Hz component, motion blurring unique to the 48-Hz image is obtained, unlike an image simply displayed at 96 Hz. This motion blurring has the same frequency as in 48-Hz display in screening at a movie theater where each of 24 frames is displayed twice, and is very close to that in screening at a movie theater. However, the waveform 706 of the 48-Hz component increases the flickering intensity at the peripheral portion, as indicated by a waveform 707 representing a flickering region.

An example will be explained below in which a "first sub frame" (M image) is generated by setting the multiplication coefficient of the multiplication circuit 105 to 1.0 and that of the multiplication circuit 106 to 0.4, and a "second sub frame" (S image) is generated by setting the multiplication coefficient of the multiplication circuit 105 to 0.3 and that of the multiplication circuit 106 to 0.4.

Figure 8:
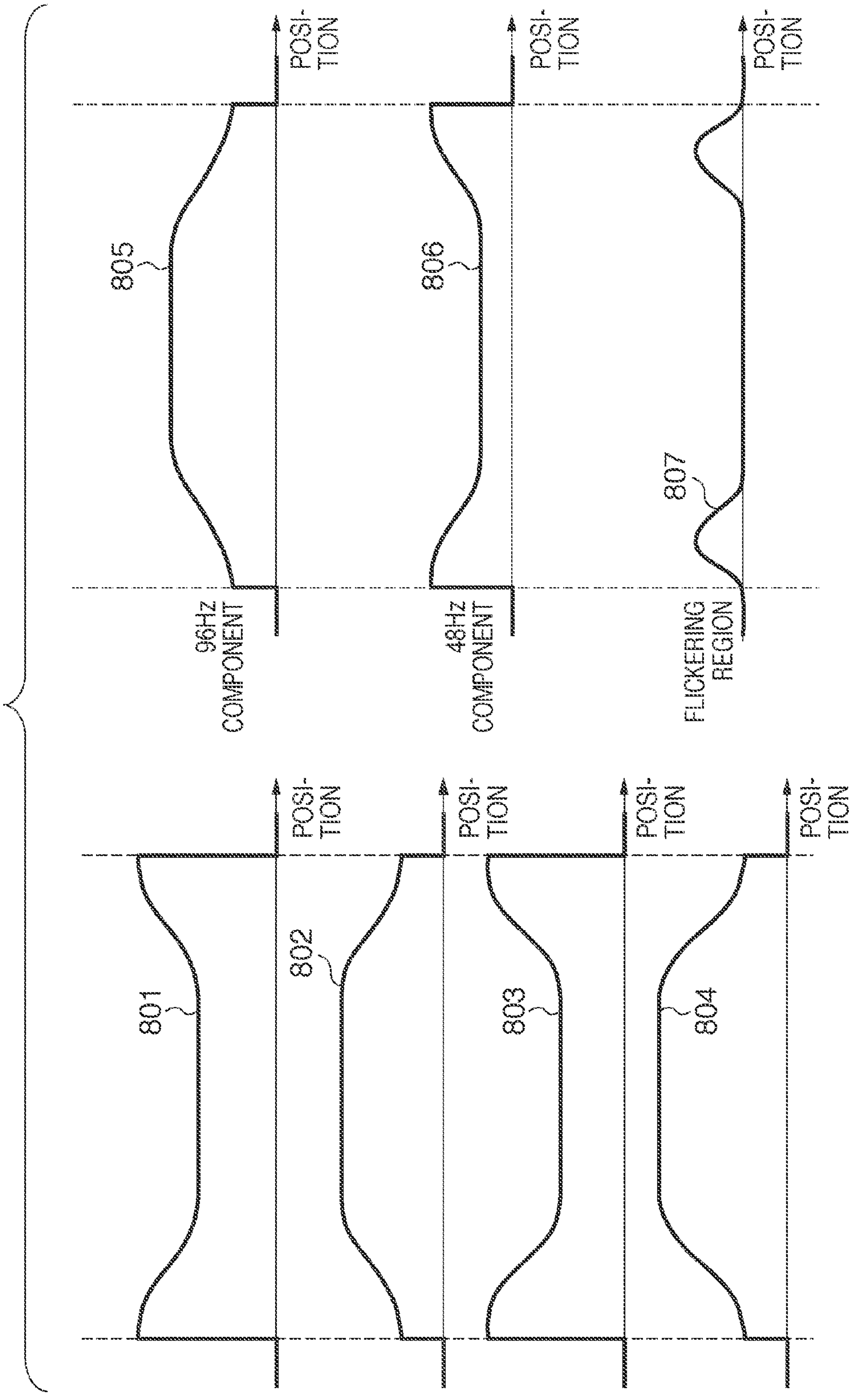
FIG. 8 is a view showing movie content display by driving distributing of the present invention and the way a user views flickering.

FIG. 8 is a view showing sub frames of a movie content displayed by driving distributing of the present invention. Waveforms 801 and 803 indicate the luminance change of the first sub frame. Waveforms 802 and 804 indicate the luminance change of the second sub frame. Waveforms 805 and 806 are obtained by further decomposing the first sub frame 801 into two luminance components for the descriptive convenience. Note that the waveform 805 is generated to be the same as the waveform 802.

In this state, the waveform 805 that is the same as the waveform 802 can be regarded as a component that is displayed four times in one frame interval (1/24 sec). On the other hand, the luminance component of the waveform 806 can be regarded as a component that is displayed only twice in one frame interval (1/24 sec). With the waveform 806 of the 48-Hz component, motion blurring unique to the 48-Hz image is obtained, unlike an image simply displayed at 96 Hz. This motion blurring has the same frequency as in 48-Hz display in screening at a movie theater where each of 24 frames is displayed twice, and is very close to that in screening at a movie theater. Focusing on the contrast ratio at 48 Hz, the contrast ratio at the central portion is about 0.1, that is, the same as in FIG. 7. The contrast ratio at the peripheral portion is about 0.3, that is, much lower than in FIG. 7. For this reason, the waveform 806 of the 48-Hz component can make the flickering intensity at the peripheral portion relatively low, as indicated by a waveform 807 representing a flickering region.

More specifically, as is apparent from FIG. 2, although flickering is still sensed, the contrast ratio of 0.3 at the peripheral portion is much lower, and the flickering intensity sensed by a human decreases by more than half. That is, the contrast ratio of two sub frames can be adjusted using two sub frames (four sub frames per frame interval) generated by the image processing apparatus shown in FIG. 1. This allows to adjust the flickering intensity to be sensed by a human.

Note that in the above description, two kinds of multiplication coefficients for two kinds of sub frames are used for four sub frames generated in one frame interval. However, all multiplication coefficients may be set to be different to generate four kinds of sub frames. For example, the coefficient of the multiplication circuit 105 may be set to be 1.0, 0.5, 0.9, and 0.6, and the coefficient of the multiplication circuit 106 may be set to be 0.3, 0.3, 0.2, and 0.2 for the first, second, third, and fourth sub frames, respectively. Defining four sub frames as one set to display the same frame every 24 Hz makes it possible to impart motion blurring unique to 24-Hz display and obtain display much closer to that at a movie theater.

As described above, according to the first embodiment, it is possible to display a moving image while suppressing both double blurring and flickering. This enables to display a higher-quality moving image for the user. Note that it is possible to not only generate the above-described 50-Hz (50i) moving image and 24-Hz (24p) moving image but also generate, from a moving image having an arbitrary frame rate, a moving image of a frame rate M (M is an even number) times the frame rate of the moving image.

Note that flickering in the above-described driving distributed processing is observable in both the hold-type display device and the impulse-type display device. Hence, the above-described image processing apparatus can obtain the same effect for both the hold-type display device and the impulse-type display device.

Note that although simple "luminance" distributed processing has been described above, the processing may be performed for the luminance (Y) component of an image expressed by YCbCr components or for the pixel value of each of the RGB colors (the luminance value of each color) of an RGB image.

Second Embodiment

Figure 11:
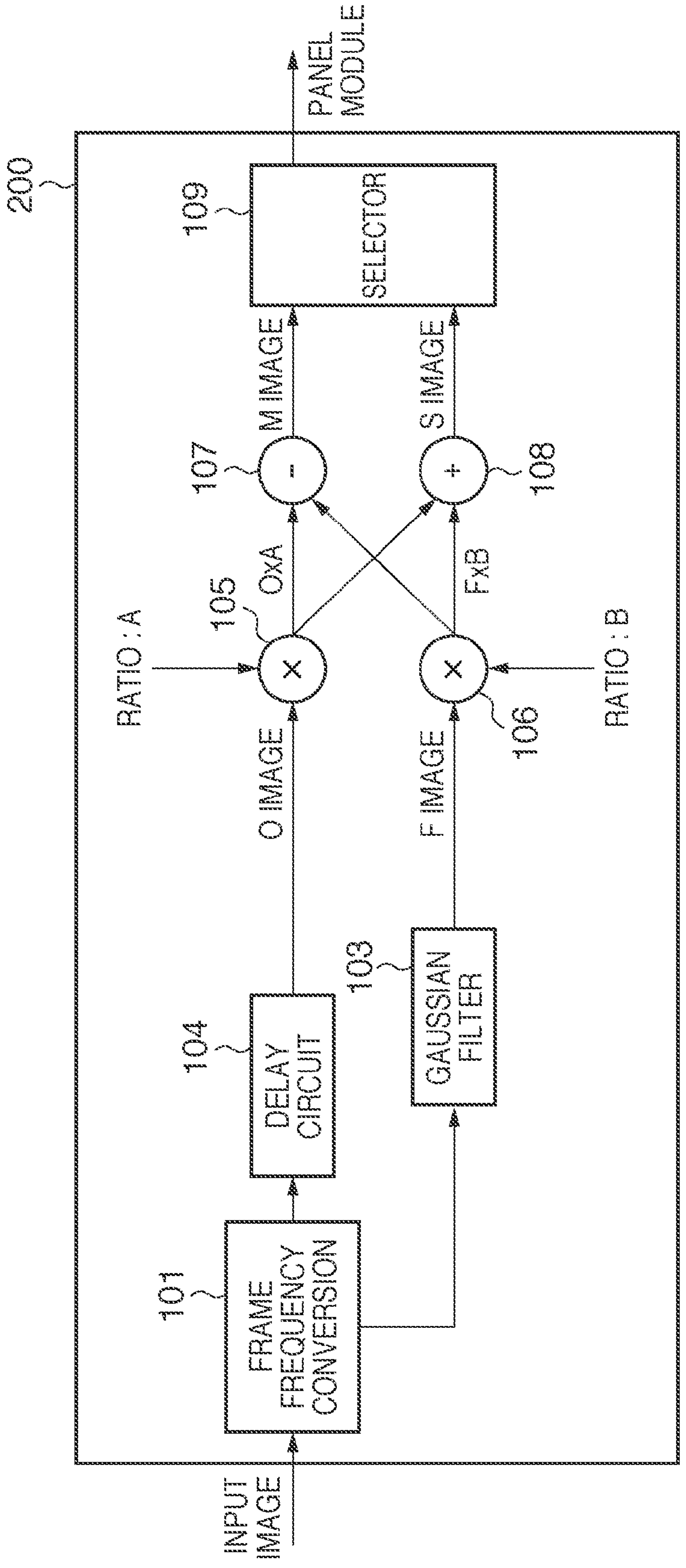
FIG. 11 is a block diagram of an image processing apparatus according to the second embodiment.

FIG. 11 is a block diagram of an image processing apparatus 200 according to the second embodiment. Note that the same reference numerals as in FIG. 1 denote the same or similar functional units in FIG. 11, and a detailed description thereof will not be repeated. In the second embodiment, the apparatus has no minimum value filter 102 at the input of a Gaussian filter 103, unlike the first embodiment. Even in the arrangement including only a filter, flickering occurs at a portion where the luminance waveform abruptly changes, as in the first embodiment.

Consider decreasing the luminance difference between sub frames using multiplication circuits 105 and 106, subtraction circuit 107, and addition circuit 108 shown in FIG. 11. An example will be described here in which a "first sub frame" (M image) and a "second sub frame" (S image) are generated by setting the multiplication coefficient of the multiplication circuit 105 to 0.6 and that of the multiplication circuit 106 to 0.4.

Figure 12:
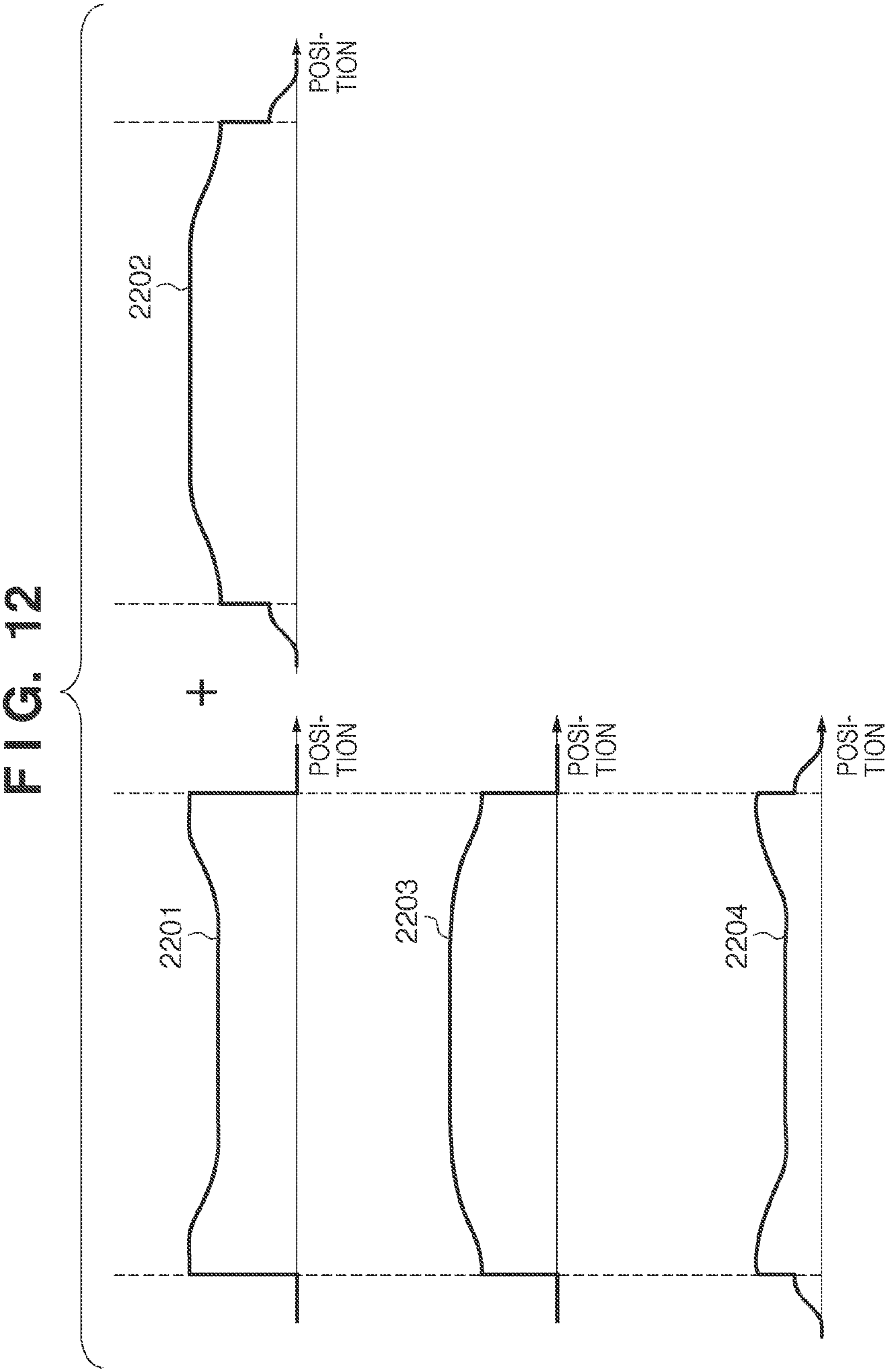
FIG. 12 is a view showing two sub frames generated by the image processing apparatus according to the second embodiment.

FIG. 12 is a view showing sub frames generated upon driving distributing by the image processing apparatus according to the second embodiment. A waveform 2201 indicates the luminance change of the first sub frame. A waveform 2202 indicates the luminance change of the second sub frame. A waveform 2203 is obtained by extracting the common part of the waveforms 2201 and 2202. A waveform 2204 indicates the difference between the waveforms 2202 and 2203.

According to the same viewpoint as in the first embodiment, the waveform 2203 can be regarded as a component that is displayed twice in one frame interval (1/50 sec). On the other hand, the luminance component of the waveform 2204 can be regarded as a component that is displayed once in one frame interval (1/50 sec). However, the luminance ratio is low not only at the central portion of the image but also at the peripheral portion. More specifically, focusing on the contrast ratio at 50 Hz, the contrast ratio at the central portion is about 0.1, and that at the peripheral portion is about 0.3.

As is apparent from FIG. 2, although flickering is still sensed, the contrast ratio of 0.3 at the peripheral portion is much lower, and the flickering intensity sensed by a human decreases by more than half. That is, the contrast ratio of two sub frames can be adjusted using two sub frames generated by the image processing apparatus shown in FIG. 11. This allows to adjust the flickering intensity to be sensed by a human.

As described above, according to the second embodiment, it is possible to display a moving image while suppressing both double blurring and flickering. This enables to display a higher-quality moving image for the user. As can be seen, a high-quality image can be obtained.

(Modification)

Note that the present inventor also found that when the first sub frame (waveform 401) and the second sub frame (waveform 402) shown in FIG. 3 are alternately displayed, they are expected to be perceived as the waveform 403 by a subject, and actually, however, the central portion of the waveform 403 looks darker than the edge peripheral portion. This is probably because the measured luminance (physical quantity) and the sensory luminance (psychological quantity) are different depending on the display frequency. Hence, the image processing apparatus 100 may include a luminance correction circuit to correct the luminance of at least one of the first sub frame" (M image) and the "second sub frame" (S image). Note that the shift amount of luminance ratio varies depending on the person, and falls within the range of about 0% to 10% considering the individual difference. Hence, correction is done so as to make the second sub frame brighter than the first sub frame by 0% to 10%.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-251358, filed Oct. 30, 2009 which is hereby incorporated by reference herein in its entirety.

What is claimed is:

1. An image processing apparatus which generates a plurality of sub frame images from an input frame image, comprising:

a filtering unit configured to perform smoothing filter processing for the input frame image;

a setting unit configured to set a first coefficient A and a second coefficient B for generating a first sub frame so as to satisfy $0<A/(A+B)<1$ and to set a third coefficient C and a fourth coefficient D for generating a second sub frame so as to satisfy $0<C/(C+D)<1$;

a first generation unit configured to generate the first sub frame image by subtracting an image obtained by multiplying a frame image processed by said filtering unit by the second coefficient B from an image obtained by multiplying the input frame image unprocessed by said filtering unit by the first coefficient A;

a second generation unit configured to generate a second sub frame image by adding an image obtained by multiplying the input frame image unprocessed by said filtering unit by the third coefficient C different from the first coefficient A and an image obtained by multiplying the frame image processed by said filtering unit by the fourth coefficient D different from the second coefficient B; and an output control unit configured to alternately output the first sub frame image and the second sub frame image at a predetermined timing.

2. The apparatus according to claim 1, wherein said output control unit alternately selectively outputs the first sub frame image and the second sub frame image at a frame rate M (M is an even number) times a frame rate of the input frame image.

3. The apparatus according to claim 1, wherein the first coefficient A and the second coefficient B satisfy $0.2<A/(A+B)<0.8$ and the third coefficient C and the fourth coefficient D satisfy $0.2<C/(C+D)<0.8$.

4. A method of controlling an image processing apparatus which generates a plurality of sub frame images from an input frame image, the method comprising the steps of:

performing smoothing filter processing for the input frame image;

setting a first coefficient A and a second coefficient B for generating a first sub frame so as to satisfy $0<A/(A+B)<1$ and setting a third coefficient C and a fourth coefficient D so as to satisfy $0<C/(C+D)<1$;

generating the first sub frame image by subtracting an image obtained by multiplying a frame image processed by the performing step by the second coefficient B from an image obtained by multiplying the input frame image unprocessed by the performing step by the first coefficient A;

generating the second sub frame image by adding the image obtained by multiplying the input frame image unprocessed by the performing step by the third coefficient C different from the first coefficient A and an image obtained by multiplying the frame image processed by the performing step by the fourth coefficient D different from the second coefficient B; and alternately outputting the first sub frame image and the second sub frame image at a predetermined timing.

5. The method according to claim 4, wherein said outputting step alternately selectively outputs the first sub frame image and the second sub frame image at a frame rate M, times a frame rate of the input frame image, where M is an even number.

6. The method according to claim 4, wherein the first coefficient A and the second coefficient B satisfy $0.2<A/(A+B)<0.8$ and the third coefficient C and the fourth coefficient D satisfy $0.2<C/(C+D)<0.8$.

7. The apparatus according to claim 1, further comprising a minimum value filtering unit configured to substitute a value of a pixel of interest with a minimum pixel value within a predetermined range from the pixel of interest, wherein the filtering unit is configured to perform the smoothing filter processing for the frame image processed by the minimum value filtering unit.

8. The method according to claim 4, further comprising a minimum value filtering step for substituting a value of a pixel of interest with a minimum pixel value within a predetermined range from the pixel of interest, wherein the performing step performs the smoothing filter processing for the frame image processed by the minimum value filtering step.

* * * * *